United States Patent
Lin

(10) Patent No.: US 9,500,216 B2
(45) Date of Patent: Nov. 22, 2016

(54) FIXING APPARATUS

(71) Applicant: HON HAI PRECISION INDUSTRY CO., LTD., New Taipei (TW)

(72) Inventor: Chia-Shih Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 288 days.

(21) Appl. No.: 14/253,200

(22) Filed: Apr. 15, 2014

(65) Prior Publication Data

US 2015/0078813 A1 Mar. 19, 2015

(30) Foreign Application Priority Data

Sep. 13, 2013 (TW) .............................. 102217237 U

(51) Int. Cl.
| | |
|---|---|
| *B25G 3/18* | (2006.01) |
| *F16B 21/00* | (2006.01) |
| *F16D 1/00* | (2006.01) |
| *F16B 21/08* | (2006.01) |
| *F16B 5/06* | (2006.01) |

(52) U.S. Cl.
CPC ............ *F16B 21/08* (2013.01); *F16B 5/0642* (2013.01); *Y10T 403/602* (2015.01)

(58) Field of Classification Search
CPC ........... Y10T 403/602; Y10T 403/608; Y10T 403/32606; F16B 21/08; F16B 5/0642
USPC ........ 403/119, 327, 330; 248/562, 566, 592, 248/636
See application file for complete search history.

(56) References Cited

U.S. PATENT DOCUMENTS

| | | | | |
|---|---|---|---|---|
| 2,145,704 A | * | 1/1939 | Wood ................... | F16L 3/2053 248/317 |
| 2,756,952 A | * | 7/1956 | Gazley ................ | B63H 21/305 188/317 |
| 3,986,406 A | * | 10/1976 | Prasad .............. | F16H 61/66245 474/14 |
| 5,254,041 A | * | 10/1993 | Duclo ................... | F16H 55/563 474/14 |
| 5,348,124 A | * | 9/1994 | Harper ..................... | B64G 1/36 188/378 |
| 5,679,172 A | * | 10/1997 | Pritt ......................... | B08B 1/00 134/18 |
| 6,664,694 B2 | * | 12/2003 | Yang ....................... | H02K 7/12 310/112 |
| 7,709,735 B2 | * | 5/2010 | Vigorito ................. | H02G 3/081 174/53 |
| 8,496,551 B2 | * | 7/2013 | Mueller .................. | F16H 55/56 474/17 |
| 8,668,623 B2 | * | 3/2014 | Vuksa ...................... | F16H 9/18 477/174 |
| 2014/0131468 A1 | * | 5/2014 | Meritt .................. | A01C 17/001 239/7 |

FOREIGN PATENT DOCUMENTS

| | | |
|---|---|---|
| CN | 2763884 Y | 3/2006 |
| CN | 201953934 U | 8/2011 |

* cited by examiner

*Primary Examiner* — Gregory Binda
*Assistant Examiner* — Nahid Amiri
(74) *Attorney, Agent, or Firm* — Zhigang Ma

(57) ABSTRACT

Fixing apparatus includes a pressing cover, a base facing to the pressing cover, a movable arm coupled between the pressing cover and the base, a chassis, an elastic element located between the pressing cover and the base, and a positioning shaft extending through the chassis, the base, and the elastic element to insert to the pressing cover. The positioning shaft forms a supporting portion away from the pressing cover. The chassis defines a first slot. When the chassis moves towards the pressing cover, the movable arm is pressed to open outwardly, the elastic element is compressed to press the chassis away from the pressing cover, the positioning portion moves towards the first slot until locks in the first slot. The fixing apparatus can press the device to the plank to fix the device on the plank.

21 Claims, 7 Drawing Sheets

FIXING APPARATUS

BACKGROUND

1. Technical Field

The present disclosure relates to fixing apparatuses, and more particularly to a fixing apparatus on a wall

2. Description of Related Art

A fixing apparatus may define a stepped hole and a cap. The stepped hole includes a big hole and a small hole. The cap is inserted into the big hole of the stepped hole, and further slides into the small hole.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
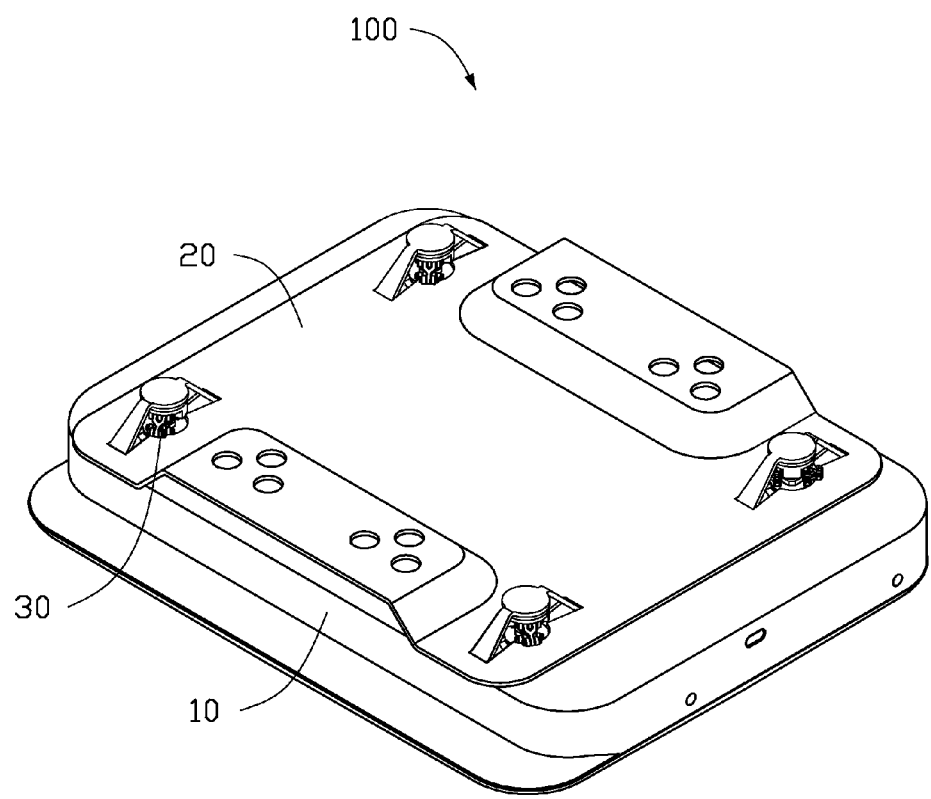
FIG. 1 is a isometric view of an embodiment of a module.

FIG. 1 illustrates a module 100 comprising a device 10, a plank 20, and a plurality of fixing apparatuses 30. The fixing apparatuses 30 are used to fix the device 10 on the plank 20.

Figure 2:
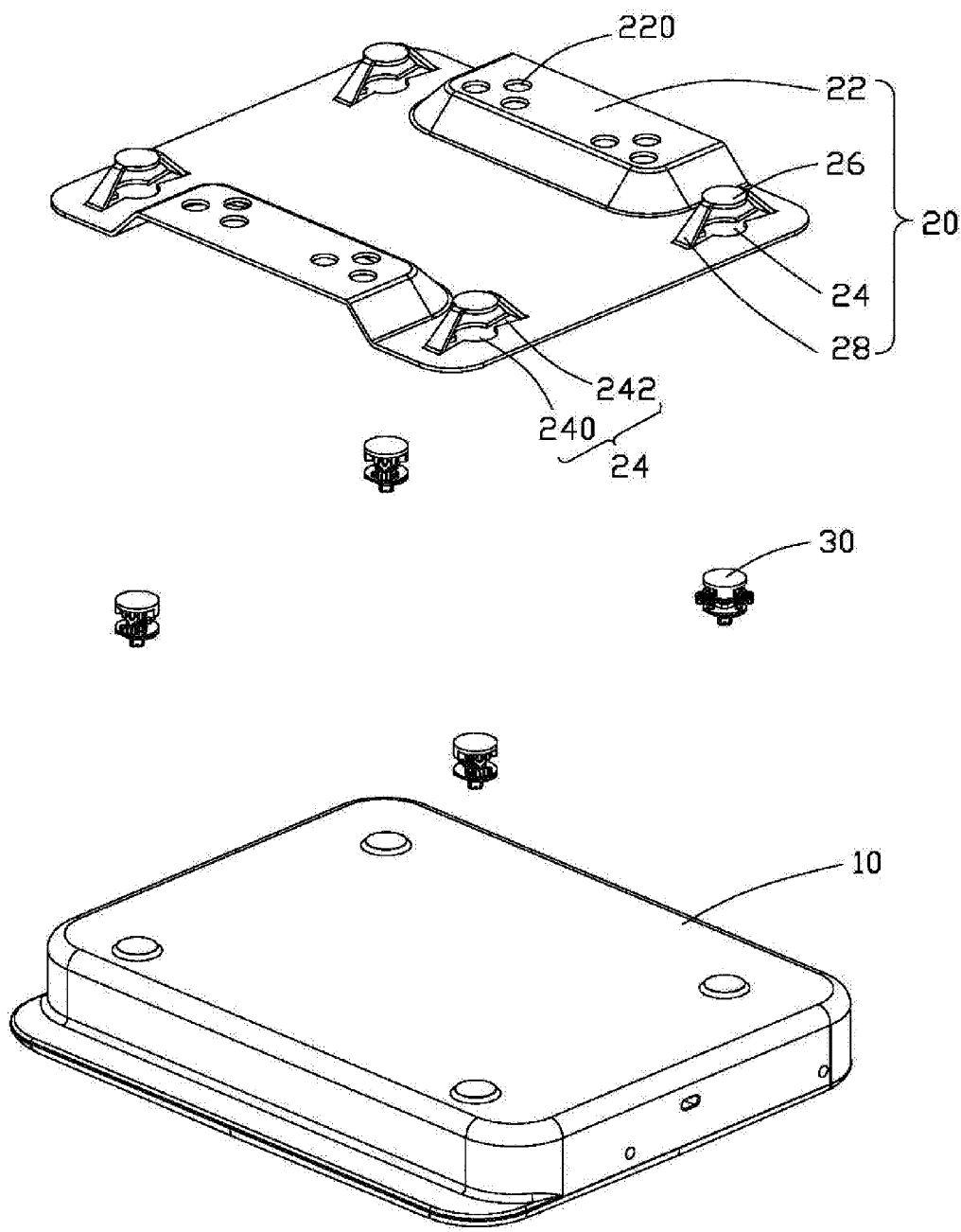
FIG. 2 is an exploded isometric view of the module of FIG. 1.
Figure 3:
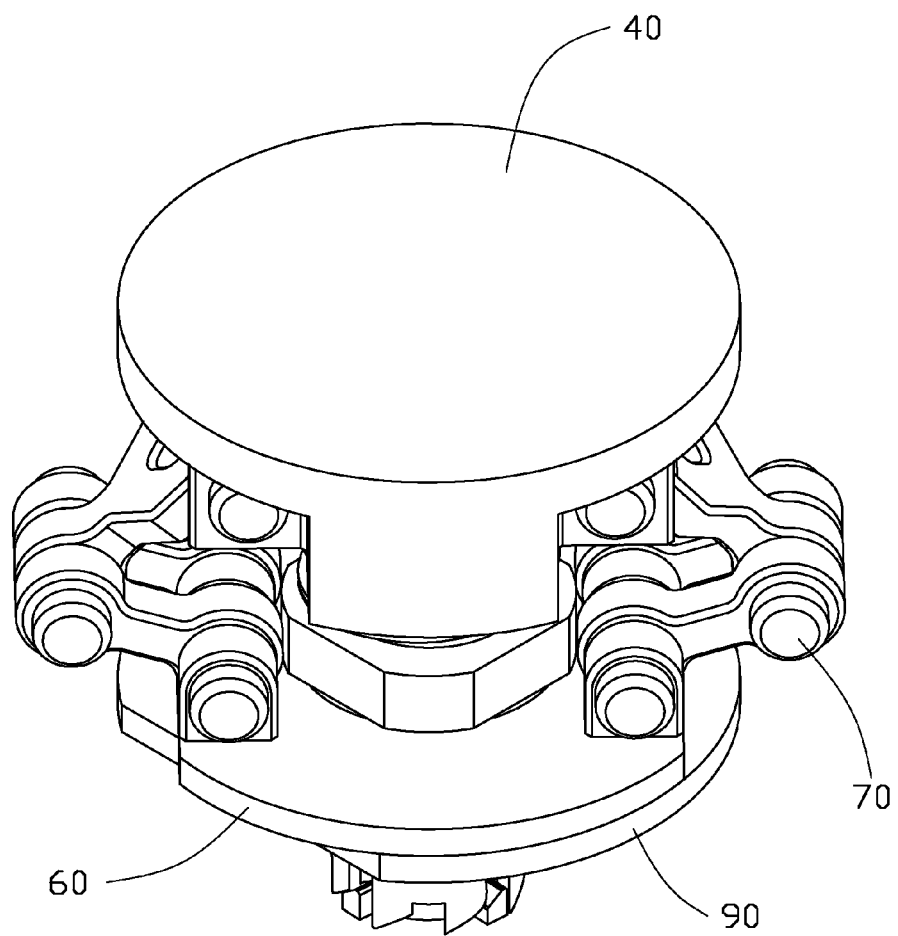
FIG. 3 is an enlarged perspective view of a fixing apparatus of the module of FIG. 2.
Figure 4:
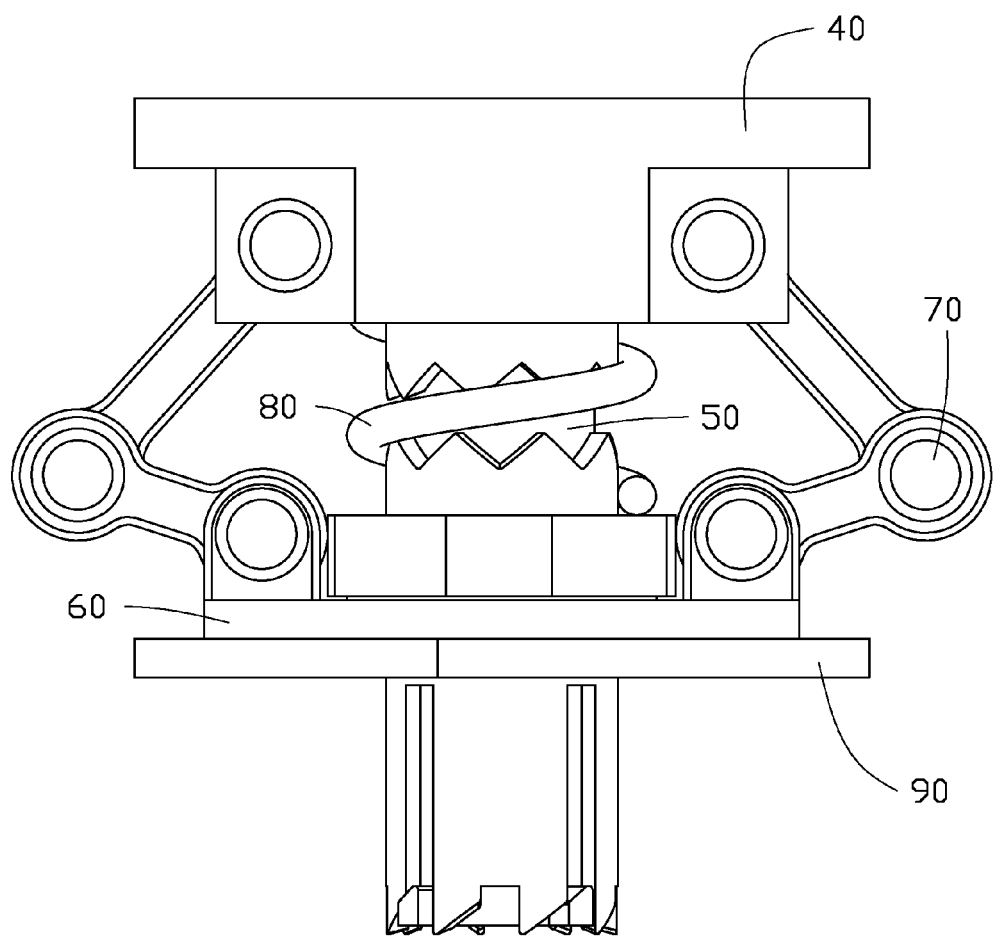
FIG. 4 is a side elevation view of the fixing apparatus of FIG. 3.
Figure 5:
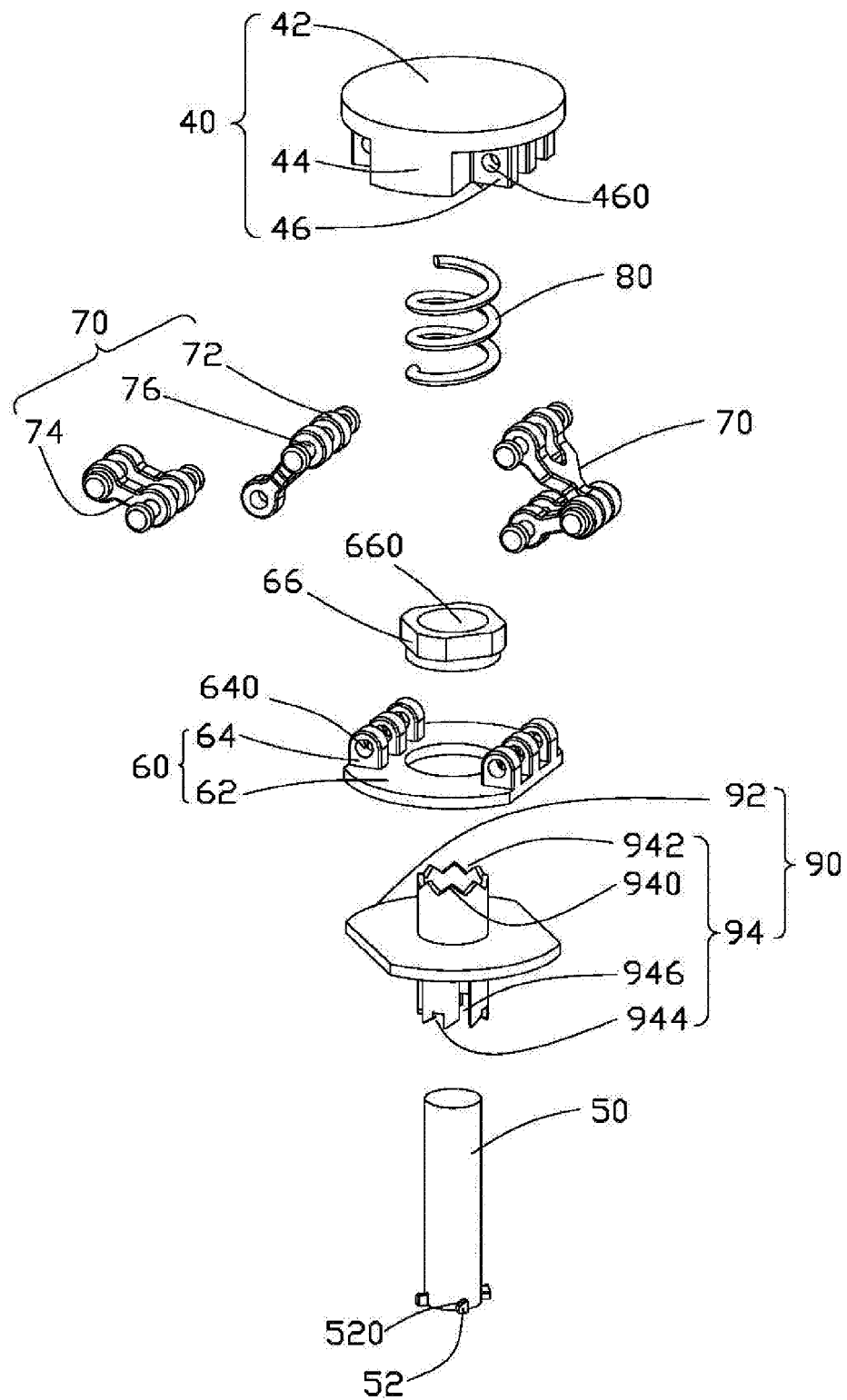
FIG. 5 is an exploded perspective view of the fixing apparatus of FIG. 3.
Figure 6:
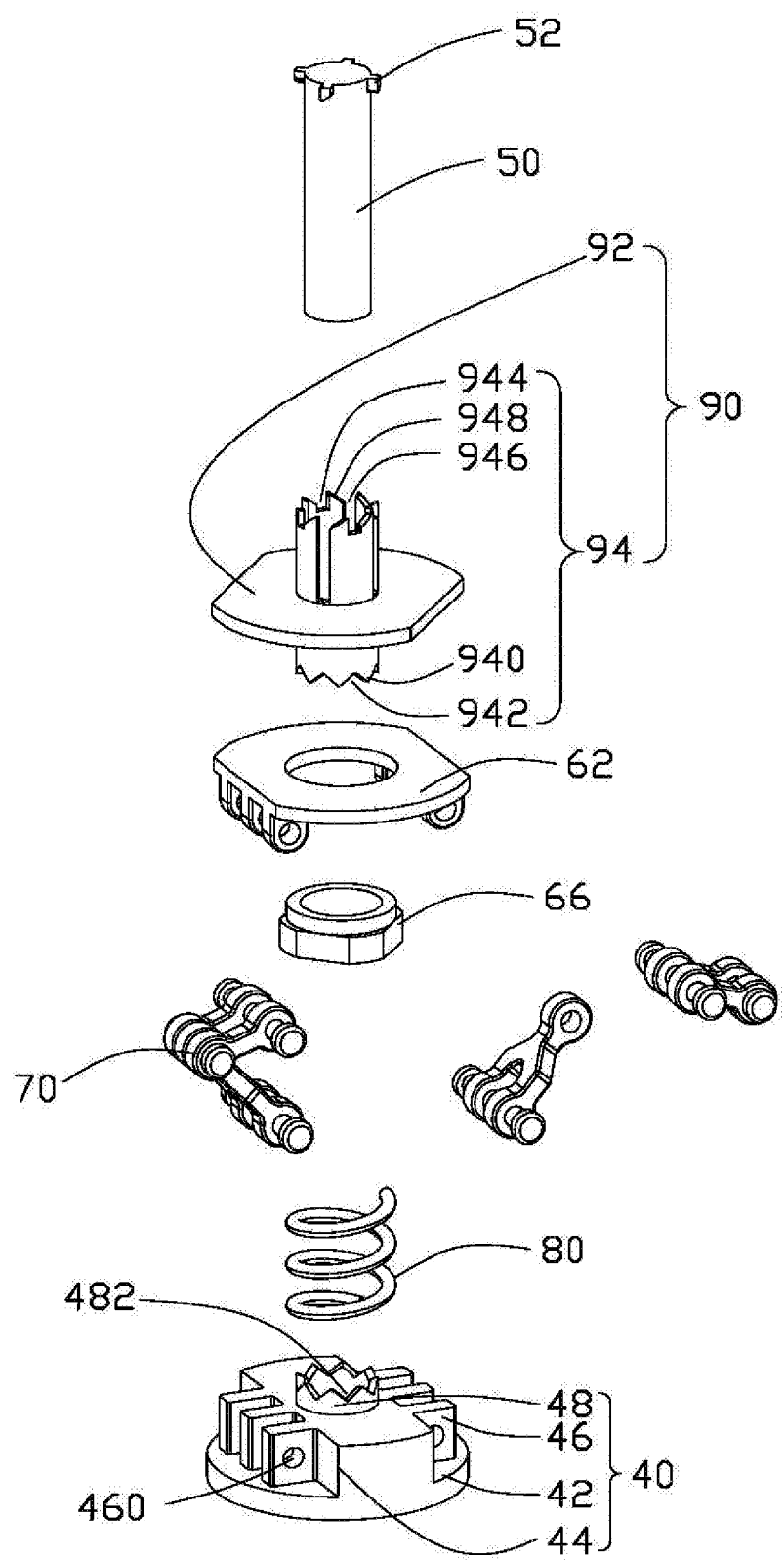
FIG. 6 is another perspective exploded view of the fixing apparatus of FIG. 3.
Figure 7:
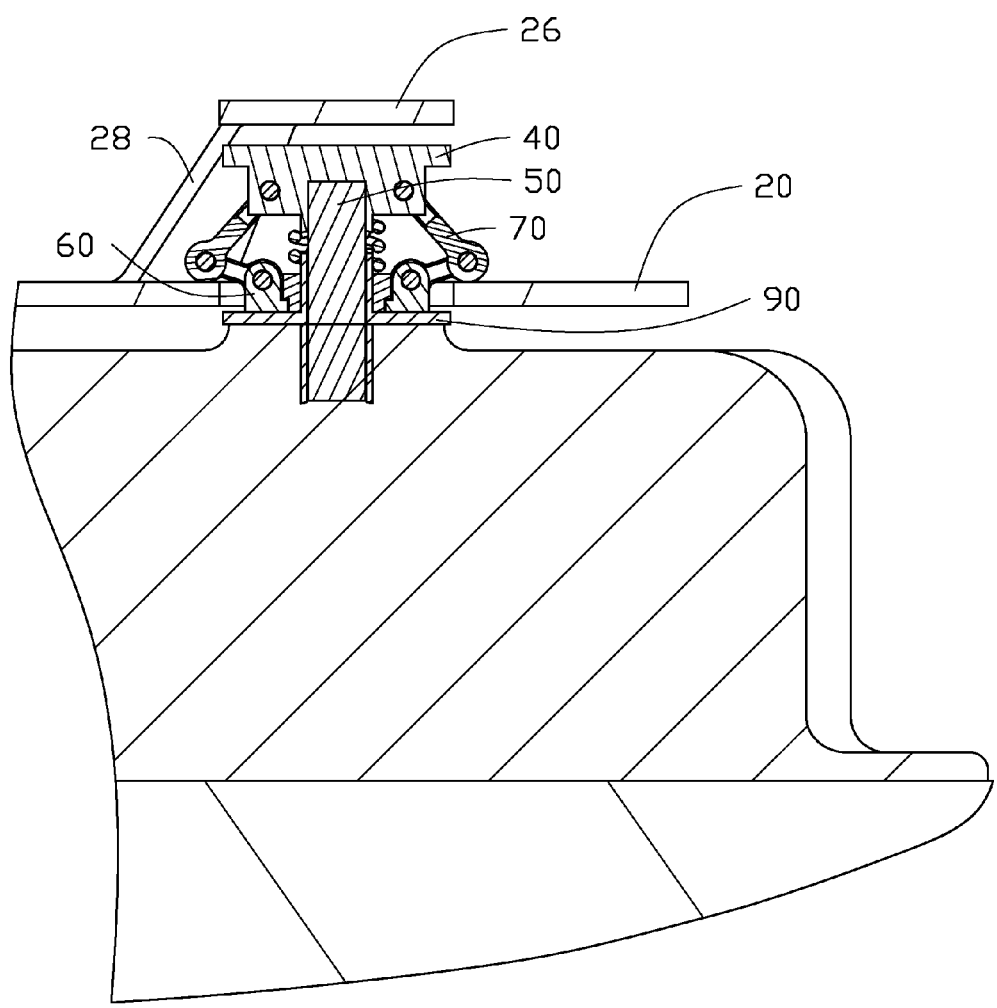
FIG. 7 is a cross-sectional view of the module of FIG. 1.

Referring to FIGS. 1 and 2, the plank 20 is punched to form two protruding shoulders 22. Each of the protruding shoulders 22 defines a plurality of substantially circular holes 220 for fixing the plank 20. Each of four corners of the plank 20 defines a through hole 24 and forms a supporting cover 26 over the through hole 24. The through hole 24 includes a center hole 240 and two collinear quadrate holes 242 located at two sides of the through hole 24. A diameter of the center hole 240 is larger than a width of each quadrate hole 242. A top portion of the supporting covers 26 are substantially coplanar with a top portion of the protruding shoulder 22. In the present embodiment, the supporting covers 26 are formed by punching the through holes 24.

Referring to FIGS. 3-6, the fixing apparatus 30 includes a pressing cover 40, a supporting shaft 50 fixed to the pressing cover 40, a base 60, a plurality of movable arms 70 connected between the pressing cover 40 and the base 60, an elastic element 80 pressed between the pressing cover 40 and the base 60, and a chassis 90.

The pressing cover 40 includes a top board 42, a protrusion 44 protruding from a bottom surface of the top board 42, a plurality of first connecting boards 46 extending substantially perpendicularly from opposite sides of the protrusion 44, and a extruding portion 48 protruding from the protrusion 44. The top board 42 is substantially circular, and a top surface of the top board 42 is used to resist the supporting cover 26. The protrusion 44 is substantially rectangular. The connecting boards 46 are substantially parallel to each other. Each of the connecting boards 46 defines a first continuous hole 460. The first continuous holes 460 are aligned with each other for cooperatively receiving a portion of the movable arm 70 therethrough. An end portion of the extruding portion 48 form a first guiding portion 480 including a plurality of first teeth 482 and a substantially V-shaped first groove 484 defined between each two adjacent first teeth 482. The first guiding 480 cooperates with the chassis 90 to position the chassis 90 relative to the pressing cover 40. The base 60 includes a bottom board 62 and a plurality of second connecting boards 64 protruding from the bottom board 62. The bottom board 62 defines a bottom board hole 620. Each of the second connecting boards 64 corresponds to one first connecting board 46. Each of the second connecting boards 64 defines a second connecting hole 640. The second connecting holes 640 are aligned with each other for cooperatively receiving a portion of the movable arm 70 therethrough.

The movable arms 70 coupled the pressing cover 40 to the base 60. Each of the movable arms 70 includes a first connecting pole 72 and a second connecting pole 74 coupled to the first connecting pole 72 by a rotatable joint 78. Each of the first connecting pole 72 and the second connecting pole 74 includes a dowel 76. The dowel 76 of the first connecting pole 72 extends through the first continuous holes 460 to couple the pressing cover 40 to the first connecting pole 72. The dowel 76 of the second connecting pole 74 extends through the second connecting holes 640 to couple the base 60 to the second connecting pole 74. The first connecting pole 72 can rotate relative to the pressing cover 40, and the second connecting pole 74 can rotate relative to the base 60. In the present embodiment, a length of the dowel 76 is larger than a width of the quadrate hole 242. The movable arm 70 can open or close about the rotatable joint 78 when the base 60 moves relative to the pressing cover 40. A cap 66 is partially received in the bottom board hole 620. The screw cap 66 is divided into a first segment 662 and a second segment 664. A diameter of the first segment 662 is smaller than a diameter of the bottom board hole 620 and extends through the bottom board hole 620. A diameter of the second segment 664 is larger than the diameter of the bottom board hole 620 and resists a surface of the bottom board hole 620. Thus, the cap 66 is hung on the bottom board 62. The cap 66 defines a cap hole 660.

The elastic element 80 is located between the cap 66 and the protrusion 44. In the present embodiment, the elastic element 80 is a spring sleeved around the supporting shaft 50. The elastic element 80 is compressed between the pressing cover 40 and the base 60.

The chassis 90 includes a supporting board 92 and a substantially hollow pillar 94 extending through a substantially central portion of the supporting board 92. The supporting board 92 is substantially the same size as the bottom board 62. A top surface of the supporting board 92 resists the bottom board 62, and a bottom surface of the supporting board 92 is fixed to the device 10. A top end portion of the empty pillar 94 protruding from the top surface of the supporting board 92 forms a second guiding portion 940 including a plurality of second teeth 942. A substantially V-shaped second groove 943 is defined between each two adjacent second teeth 942. A shape and size of the second guiding portion 940 are substantially the same as a shape and size of the first guiding portion 480. The second teeth 942 are misaligned with the first teeth 482 to provide a biasing force to rotate the pressing cover 40 relative to the chassis 90. A bottom end portion of the empty pillar 94 protruding from the bottom surface of the supporting board 92 alternately defines a plurality of first slots 944 and a plurality of second slots 946. A depth of the first slot 944 is less than a depth of the second slot 946. In the present embodiment, the second slot 946 extends to the supporting board 92. A first sloped surface 948 is formed between each adjacent first slot 944 and second slot 946.

The supporting portion 50 extends through the empty pillar 94 of the chassis 90, the bottom board hole 620 of the base 60, and the cap hole 660 of the cap 66. A first end portion of the supporting portion 50 is fixedly received in the extruding portion 48 of the pressing cover 40. A second end portion of the supporting portion 50 defines a plurality of positioning portions 52. The positioning portions 52 are received in either the first slots 944 or the second slots 946. In the present embodiment, a width of each positioning portion 52 is smaller than a width of each of the first slots 944 and of the second slots 946. One end portion of each positioning portion 52 forms a second sloped surface 520. A degree of slant of the first sloped surface 948 is substantially the same as a degree of slant of the second sloped surface 520. The first sloped surfaces 948 and the second sloped surfaces 520 facilitate the positioning portions 52 moving from the first slots 944 to the second slots 946, and from the second slots 946 to the first slots 944. Before use, the positioning portions 52 are received in the second slots 946, such that the pressing cover 40 and the base 60 are spaced a maximum distance apart, and that the movable arms 70 are opened a maximum amount.

Referring to FIGS. 3-7, in assembly, the fixing apparatuses 30 are fixed to the device 10. In detail, the supporting board 92 is fixed to a surface of the device 10. The supporting shaft 50 extends through the chassis 90, the base 60, and the cap 66, and the first end portion of the supporting shaft 50 is fixedly received into the extruding portion 48. The positioning portions 52 are received in the second slots 946. The first segment 662 of the cap 66 extends through the bottom board hole 620, and the second segment 664 of the base 60 resists the bottom board 62. The elastic element 80 is sleeved around the supporting shaft 50 and compressed between the pressing cover 40 and the crew cap 66. The movable arms 70 can open and close along with movements of the pressing cover 40 and the base 60. A first distance between two points of the two movable arms 70 is defined as D1. D1 is smaller than the diameter of the center hole 240 of the through hole 24.

The device 10 is mounted to the plank 20, such that the fixing apparatuses 30 extend through the through holes 24. The device 10 is pressed to cause the pressing cover 40 to resist the supporting cover 26, until the elastic element 80 is compressed. At the same time, the chassis 90, the base 60, and the cap 66 are moved toward the pressing cover 40, and the positioning portions 52 are gradually moved to the second slots 946. The movable arms 70 are gradually closed as the first connecting portions 72 are moved toward the second connecting portions 74. The second teeth 942 of the empty pillar 94 resist the first grooves 484 of the first guiding portion 480, causing the pressing cover 40 to rotate relative to the chassis 90, and the supporting shaft 50 to rotate, thereby moving the positioning portions 52 into the first slots 944. After the device 10 is released, the elastic element 80 restores, causing the positioning portions 52 to be received into the first slots 944. Thus, the distance between the pressing cover 40 and the chassis 90 is decreased, and the movable arm 70 is closed. A second distance D2 between the two points of the movable arm 70 is larger than the first distance D1. The second distance D2 is larger than the diameter of the center hole 240, so the device 10 can be hung on the plank 20 via the movable arms 70. In the present embodiment, the device 10 only needs to be pressed to fix the device to the plank 20. Thus, it is simple and fast to assemble.

To disassemble the device 10 from the plank 20, the device 10 is pressed, causing the positioning portions 52 to be received into the second slots 946. The distance between the pressing cover 40 and the chassis 90 is increased, causing the movable arms 70 to open, The distance becomes the D1, because the first distance D1 between the two points of the movable arm 70 is smaller than the diameter of the center hole 240 of the through hole 24, thus, the device 10 can be released from the plank 20.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:
1. A fixing apparatus, comprising:
a pressing cover;
a base facing the pressing cover;
a movable arm connecting between the pressing cover and the base;
a chassis connecting with base and defining a first slot and an adjacent slot;
an elastic element located between the pressing cover and the chassis; and
a supporting shaft extending through the chassis, the base and the elastic element to fix to the pressing cover, the supporting shaft comprising a positioning portion located one end of the supporting shaft; wherein the positioning portion of the supporting shaft moves toward the first slot to insert into the first slot when the chassis moves toward the pressing cover to position the chassis on the pressing cover, the elastic element is pressed to provide an elastic force for pushing the chassis away from the pressing cover, when the positioning portion is switched to be received in the second slot, the movable arm closes with force of the elastic element, the chassis and the pressing cover are spaced apart.

2. The fixing apparatus of the claim 1, wherein the chassis is configured to move toward the pressing cover, the base and the supporting shaft is configured to rotate relative to the chassis.

3. The fixing apparatus of the claim 2, wherein the second slot is with a depth less than the depth of the first slot.

4. The fixing apparatus of the claim 3, wherein the first slot and the second slot are connected by a first sloped surface, the positioning portion of the supporting shaft defines a second sloped surface, the cooperating between the second sloped surface and the first sloped surface helps the supporting shaft rotate relative to the chassis after the positioning portion moves out of the second slot.

5. The fixing apparatus of the claim 4, wherein the pressing cover comprises a first guiding portion, the chassis comprises a second guiding portion facing to the first guiding portion, the second guiding portion and the first guiding portion resist to each other to make the pressing cover rotate relative to the chassis when the chassis moves toward the pressing cover.

6. The fixing apparatus of the claim 5, wherein the chassis comprises a supporting board and an empty pillar formed on the supporting board, the first guiding portion and the first slot are located on two ends of the empty pillar, respectively.

7. The fixing apparatus of the claim 5, wherein the first guiding portion comprises a plurality of first teeth and a plurality of the first grooves located between each two adjacent first teeth, the second guiding portion comprises a plurality of second teeth and a plurality of the second grooves located between each two adjacent second teeth, wherein the second tooth is misaligned with the first groove.

8. The fixing apparatus of the claim 7, wherein the first teeth has a biasing force to second teeth to make the pressing cover rotate relative to the chassis.

9. The fixing apparatus of the claim 8, wherein the first tooth connects with second tooth before the first sloped surface connects with the second sloped surface.

10. The fixing apparatus of the claim 1, wherein the movable arm comprises a first connecting pole connecting with the pressing cover and a second connecting pole connecting with the base and the first connecting pole, when the chassis moves toward the pressing cover, the second connecting pole closes to the first connecting pole.

11. A module comprising:
a plank, a device positioned on the plank, and a fixing apparatus, the device is mounted on the plank with the fixing apparatus, wherein the fixing apparatus comprising:
a pressing cover;
a base facing the pressing cover;
a movable arm connecting between the pressing cover and the base;
a chassis connecting with base and defining a first slot and an adjacent second slot;
an elastic element located between the pressing cover and the chassis; and
a supporting shaft extending through the chassis, the base and the elastic element to fix to the pressing cover, the supporting shaft comprising a positioning portion located one end of the supporting shaft; wherein the positioning portion of the supporting shaft moves toward the first slot to insert into the first slot when the chassis moves toward the pressing cover to position the chassis on the pressing cover, the elastic element is pressed to provide an elastic force for pushing the chassis away from the pressing cover, the movable arm opens; when the positioning portion is switched to be received in the second slot, the movable arm closes with force of the elastic element, the chassis and the pressing cover are spaced apart.

12. The fixing apparatus of the claim 11, wherein the chassis is configured to move toward the pressing cover, the base and the supporting shaft is configured to rotate relative to the chassis.

13. The fixing apparatus of the claim 11, wherein the second slot is with a depth less than the depth of the first slot.

14. The fixing apparatus of the claim 13, wherein the first slot and the second slot are connected by a first sloped surface, the positioning portion of the supporting shaft defines a second sloped surface, the cooperating between the second sloped surface and the first sloped surface helps the supporting shaft rotate relative to the chassis after the positioning portion moves out of the second slot.

15. The fixing apparatus of the claim 14, wherein the pressing cover comprises a first guiding portion, the chassis comprises a second guiding portion facing to the first guiding portion, the second guiding portion and the first guiding portion resist to each other to make the pressing cover rotate relative to the chassis when the chassis moves toward the pressing cover.

16. The fixing apparatus of the claim 15, wherein the chassis comprises a supporting board and an empty pillar formed on the supporting board, the first guiding portion and the first slot are located on two ends of the empty pillar, respectively.

17. The fixing apparatus of the claim 15, wherein the first guiding portion comprises a plurality of first teeth and a plurality of the first grooves located between each two adjacent first teeth, the second guiding portion comprises a plurality of second teeth and a plurality of the second grooves located between each two adjacent second teeth, wherein the second tooth is misaligned with the first groove.

18. The fixing apparatus of the claim 17, wherein the first teeth has a biasing force to second teeth to make the pressing cover rotate relative to the chassis.

19. The fixing apparatus of the claim 18, wherein the first tooth connects with second tooth before the first sloped surface connects with the second sloped surface.

20. The fixing apparatus of the claim 11, wherein the movable arm comprises a first connecting pole connecting with the pressing cover and a second connecting pole connecting with the base and the first connecting pole, when the chassis moves toward the pressing cover, the second connecting pole closes to the first connecting pole.

21. A fixing apparatus, comprising:
a pressing cover;
a base facing the pressing cover;
a movable arm connecting between the pressing cover and the base;
a chassis connecting with base and defining a first slot and an adjacent second slot;
an elastic element located between the pressing cover and the chassis; and
a supporting shaft extending through the chassis, the base and the elastic element to fix to the pressing cover, the supporting shaft comprising a positioning portion located one end of the supporting shaft; wherein the positioning portion of the supporting shaft moves toward the first slot to insert into the first slot when the chassis moves toward the pressing cover to position the chassis on the pressing cover, the elastic element is pressed to provide an elastic force for pushing the chassis away from the pressing cover;
wherein the first slot and the second slot are connected by a first sloped surface, the positioning portion of the supporting shaft defines a second sloped surface, the cooperating between the second sloped surface and the first sloped surface helps the supporting shaft rotated relative to the chassis after the positioning portion moves out of the second slot.

* * * * *